US006735171B2

(12) United States Patent
Takeguchi

(10) Patent No.: US 6,735,171 B2
(45) Date of Patent: *May 11, 2004

(54) SDH TRANSMISSION SYSTEM, SDH TRANSMISSION EQUIPMENT AND LINE SWITCHING CONTROL METHOD IN SDH TRANSMISSION SYSTEM

(75) Inventor: Koji Takeguchi, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,338

(22) Filed: Mar. 3, 1999

(65) Prior Publication Data

US 2003/0043734 A1 Mar. 6, 2003

(30) Foreign Application Priority Data

Jul. 28, 1998 (JP) ............................. 10-213129

(51) Int. Cl.⁷ ............................................. H04L 12/56
(52) U.S. Cl. ..................... 370/235; 370/223; 370/225
(58) Field of Search ................................. 370/216, 225, 370/242, 248, 223, 235

(56) References Cited

U.S. PATENT DOCUMENTS

| 5,163,041 A | * | 11/1992 | Moriyama | 370/228 |
| 5,406,255 A | * | 4/1995 | Fujimoto et al. | 340/521 |
| 5,442,620 A | * | 8/1995 | Kremer | 370/224 |
| 5,517,489 A | * | 5/1996 | Ogura | 370/223 |
| 5,715,237 A | * | 2/1998 | Akiyoshi | 370/228 |
| 5,757,769 A | * | 5/1998 | Ikawa | 340/825.01 |
| 5,905,585 A | * | 5/1999 | Shirai | 359/110 |
| 5,978,354 A | * | 11/1999 | Taketomi et al. | 340/2.6 |
| 6,009,075 A | * | 12/1999 | Roberts et al. | 370/219 |
| 6,038,211 A | * | 3/2000 | Lemaire | 370/216 |
| 6,057,948 A | * | 5/2000 | Mizrahi | 359/110 |
| 6,094,441 A | * | 7/2000 | Jung et al. | 370/466 |
| 6,118,795 A | * | 9/2000 | Fukunaga et al. | 370/503 |
| 6,256,291 B1 | * | 7/2001 | Araki | 340/825.01 |

FOREIGN PATENT DOCUMENTS

| JP | 7-264156 | 10/1995 |
| JP | 8-288981 | 11/1996 |

* cited by examiner

Primary Examiner—Wellington Chin
Assistant Examiner—William Schultz
(74) Attorney, Agent, or Firm—Katten Muchin Zavis Rosenman

(57) ABSTRACT

This invention relates to an SDH transmission technique, wherein one SDH transmission equipment is provided with a first switching control part which performs a line switching control between a work line and a protection line in accordance with setting information on a line switching control and a setting information transfer part which transfers the setting information to other SDH transmission equipment as setting information at other SDH transmission equipment, while other SDH transmission equipment is provided with a setting information detection part which detects the setting information transferred from the one SDH transmission equipment and a second line switching control part which performs a line switching control at own side in accordance with the setting information detected by the setting information detection part. Accordingly, an occurrence of disagreement of setting information on the line switching control in an SDH transmission system can be prevented and a normal line switching control between opposite equipments can be always performed.

29 Claims, 10 Drawing Sheets ( NON MARKED bytes ARE UNDEFINED bytes )

FIG. 4

K1 byte

| bit | 7 | 6 | 5 | 4 | 3 | 2 | 1 | 0 |
|---|---|---|---|---|---|---|---|---|
| | SW REQUEST TYPE | | | | SWITCHING REQUEST CHANNEL | | | |

FIG. 5

K2 byte

| bit | 7 | 6 | 5 | 4 | 3 | 2 | 1 | 0 |
|---|---|---|---|---|---|---|---|---|
| | BRIDGE CHANNEL NUMBER | | | | | OTHERS | | |

TYPE OF SWITCHING OPERATION

SDH TRANSMISSION SYSTEM, SDH TRANSMISSION EQUIPMENT AND LINE SWITCHING CONTROL METHOD IN SDH TRANSMISSION SYSTEM

BACKGROUND OF INVENTION (1) Field of the Invention

This invention relates to an SDH (Synchronous Digital Hierarchy) transmission system, an SDH transmission equipment and a line switching control method in the SDH transmission system which can be favorably used for making the line configuration of the SDH transmission system redundant.

(2) Description of the Related Art

Recently, an introduction of so called SDH network [called SONET (Synchronous Optical NETwork) in North America]) has been planned in every countries in the world along with the standardization of the transmission technique or method of SDH network recommended by ITU-T (while the SONET is recommended by Bellcore). This SDH network (SDH transmission system) is constructed by using various transmission equipment in accordance with SDH transmission system such as line terminal equipment or regenerator (hereinafter called "SDH transmission equipment" or "SDH equipment").

As shown in FIG. 9, for example, the SDH transmission system 100 usually makes the line which connects an SDH equipment 200 with an SDH equipment 300 have a redundant configuration for enhancing the reliability of communication by providing a protection line 500 besides a work line 400 and once a fault such as a disconnection of line occurs on the work line 400, the communication line is readily switched to the protection line 500 so as to avoid the disconnection of communication (main signal) caused by the line fault.

In the SDH network, the switching between the above-mentioned work line 400 and the protection line 500 is controlled with APS (Automatic Protection System) byte (K1, K byte) defined in a section overhead (SOH) 11 of a transmission frame [STM: Synchronous Transfer Module (STS: Synchronous Transport Signal in SONET)] having a frame format as shown in FIG. 11, for example.

In FIG. 11, a portion which follows SOH 11 is called as payload 12 and in this payload 12, a given number [e.g. 3 for VC-3 (approximately 51 Mb/s) and 1 for VC-4 (approximately 150 Mb/s)] of desired communication data (main signal) such as ATM (Asynchronous Transfer Mode) cells are stored as lower order virtual containers (VC) corresponding to its transmission speed and their stored locations [the head (J1 byte) of the path overhead (POH) 13] are indicated by AU pointers 14 of SOH 11.

For realizing the above-mentioned APS control function, the SDH equipment 200 (300), as shown in FIG. 10, for example, at least comprises a work unit 201W (301W) which performs a transmission processing (bidirectional) through the work line 400 (a down-line 400A, an up-line 400B) and a protection unit 201P (301P) which functions as a backup for this work line 201W(301W) and performs a transmission processing (bidirectional) through the protection line 500 (a down-line 500A, an up-line 500B). The SDH equipment 200 (300) further includes an APS control firmware 202(302) which performs a switching (APS) control between these units 201W, 201P (301W, 301P).

In this case, however, the same signals (transmission frames) are transmitted through the work down-line 400A (or the up-line 400B) and the protection down-line 500A (or the up-line 500B) respectively and, in an usual operation, the reception terminal (SDH equipment 200, 300) selectively receives either one of signals (e.g. the signal having a better quality).

In FIG. 10, numerals 203 (303) indicate main signal transmission parts, numerals 204(304) indicate POH insertion processing parts for inserting POH 13 into the transmitting main signals, numerals 205(305) indicate POH termination processing parts which terminate POH 13 of the main signals after a termination of SOH 11, and numeral 206 (306) indicate main signal reception parts for receiving main signals after termination of POH 13.

In FIG. 10, numerals 600, 700 respectively indicate microcomputers ($\mu$-COM). Using these microcomputers 600, 700, a maintenance man of the network individually sets setting information on APS control such as a unidirectional/bidirectional switching operation, a 1+1/1+N switching operation to respective APS control firmware (hereinafter simply referred to as "firmware") 202, 302.

Here, "the unidirectional switching operation" means, for example, an operation to switch both work down-line 400A and work up-line 400B to the protection down-line 500A and the protection up-line 500B when a fault occurs on the work down-line 400A, while "the bidirectional switching operation" means, for example, an operation to switch only the down-line 400A to the protection down-line 500A when a fault occurs on the down-line 400A.

The "1+1 switching operation" means a switching operation used when the protection line is configured such that one protection line corresponds to one work line, while the "1+N switching operation" means a switching operation used when the protection line is configured such that one protection line corresponds to a plurality (N: integers more than 2) of work lines. In the configuration shown in FIG. 10, since the work units 201W and 301W (the protection units 201P and 301P) respectively include the down-line 400A (500A) and the up-line 400B (500B), the APS setting information to be set to the firmwares 202 and 302 become the "1+1 switching operation" and the "unidirectional switching operation".

Incidentally, as shown in FIG. 10, the work unit 201W (301W) is provided with a line fault detection/SOH termination part 211W (311W), a high impedance part (switching part) 212 W (312W) and an SOH insert processing part 213W (313W), while the protection unit 201P (301P) is provided with a line fault detection/SOH termination part 211P (311P), a high impedance part (switching part) 212P (312P) and an SOH insert processing part 213P (313P).

Here, the SOH insert processing parts 213W, 213P (313W, 313P) respectively build up their transmission frames (synchronous transfer modules) by giving (inserting) the SOH 11 to the main signals addressed to the opposite side equipment 300 (200) in which the POH is already inserted. During this insert processing of the SOH 11, "the switching request" and the "switching response" generated in the firmware 202 (302) are inserted and transmitted to the opposite side equipment 300 (200) as the APS byte (K1, K byte) of the SOH 11.

The line fault detection/SOH termination parts (hereinafter simply referred to as the "termination parts") 211W, 311W (211P, 311P) respectively detect a fault of the work line 400 (the protection line 500) by monitoring fault factors such as an input disconnection of optical signals (transmission frame) or the deterioration of input optical signals with an application (software) during the communication operation using the work units 201W, 301W (the protection units 201P, 301P), while the termination parts 211W, 311W (211P, 311P) detect the "switching request" or the "switching response" from the opposite side equipment 300 (200) which are inserted to the SOH 11 as the APS byte by terminating the SOH 11 of the reception-side transmission frame.

Furthermore, when the line fault is detected at the termination part 211W(311W) or 211P (311P), the firmware 202 (302) recognizes the content of the fault and performs the transmission and reception of the APS byte between the opposite side equipment 300 (200) through the protection line 500 (or the work line 400) and performs the switching control between the work unit 201W (301W) and the protection unit 201P (301P) of the own side equipment.

The above switching control is performed in such a manner that the firmware 202 (302) controls the conducting state and nonconducting state of the switching parts 212W, 212P (312W, 312P) and such a control is always performed in response to the APS setting information set by the microcomputer 600 (700).

Hereinafter, the APS control performed in the SDH transmission system 100 (the SDH transmission equipment 200, 300) is explained in view of a case that a fault occurs on the down-line 400B of the work line 400.

When the fault occurs on the down-line 400B, this fault is detected at the termination part 211W of the work unit 201W of the reception-side SDH equipment 200. Then, the firmware 202 generates "a switching request" addressed to the opposite side station 300 in accordance with the APS setting information set by the microcomputer 600 in advance. This "switching request" is inserted to the SOH 11 of the transmission frame as APS byte (K1 byte) at the SOH insert processing part 213P of the protection unit 201P and is transmitted to the opposite side equipment 300 through the protection up-line 500B.

In the opposite side equipment 300, when the APS byte is detected at the termination part 311P of the protection unit 301P, the firmware 302 switches the system in service from the work unit 301W to the protection unit 301P in accordance with the APS setting information set by the microcomputer 700 in advance. Upon completion of this switching, the "switching response" addressed to the opposite side equipment 200 is generated. This "switching response" is inserted into the SOH 11 of the transmission frame for download as the APS byte (K 2 byte) and is transmitted through the protection down-line 500A.

When the APS byte is detected at the termination part 211P of the protection unit 201P of the SDH equipment 200, the firmware 202 confirms the completion of the switching of the opposite side equipment 300 and switches the system in service at own side equipment 200 from the work unit 201W to the protection unit 201P in accordance with the APS setting information set by the microcomputer 600 as in the case of the opposite side equipment 300.

Accordingly, the communication performed using the work up-line 400A is relieved by the protection up-line 500A so that a normal communication can be continued. When a line fault is detected at the termination part 311W of the opposite side equipment 300, the firmware 302 performs the similar processing as the starting point. Furthermore, when a line fault is detected in the protection unit 201P or 301P, the transmission and reception of the APS byte are performed through the work unit 201W (301W) in a similar manner so as to provide a switching from the protection unit 201P (301P) to the work unit 201W (301W).

In the above-mentioned SDH transmission system 100 (SDH transmission system 200, 300), however, usually, routes (e.g. paths and sections) are set in a plurality of directions and a plurality of APS setting information which correspond to these routes are present. Accordingly, assuming that setting of the APS setting information to the firmware 202, 302 are independently performed corresponding to respective SDH equipment 200, 300, this setting may be performed erroneously in either one of these SDH equipment 200 (or 300).

In such a case, since the setting at respective firmware 202, 302 are different from each other, the respective SDH equipment 200, 300 perform the switching control different from each other at the time of occurrence of a line fault so that, in a worst case, the main signal suffers from the nonconductive state and the normal line relief cannot be performed.

Conventionally, several techniques have been proposed for solving these problems, wherein one technique which is disclosed in Japanese Patent laid-open No. HEI 7-264156 solves the problem by detecting such a disagreement of setting (a mode mismatch) at the SDH equipment 200 (300) and another technique disclosed in Japanese Patent laid-open No. HEI 8-288981 performs a normal switching operation even when a mode mismatch is present.

These techniques, however, place their focuses on how to cope with the disagreement of setting which have already occurred or will occur in future. In other words, these techniques regard the occurrence of the disagreement of setting as the premise. Accordingly, functions to be added to the SDH equipment are increased, and the equipment configuration becomes large-sized, and the line switching control becomes complicated. In view of the above, these techniques are less than optimal for resolving the above-mentioned disagreement of setting.

SUMMARY OF THE INVENTION

The present invention has been made to overcome these problems and it is an object of the present invention to provide an SDH transmission system, an SDH transmission equipment and a line switching control method for an SDH transmission system which prevents the occurrence of the disagreement of setting and always assures a normal line switching control between equipment which face each other.

For achieving the above object, the present invention discloses the SDH transmission system which is provided with at least two SDH transmission equipments which are connected while facing each other through a work line which transmits a transmission frame conforming to the SDH transmission method and a protection line which functions as a backup for the work line, wherein one SDH transmission equipment comprises a first line switching control part which performs a line switching control between the work line and the protection line in accordance with setting information on the line switching control and a setting information transfer part which transfers the setting information to other SDH transmission equipment as setting information on a line switching control at other SDH transmission equipment, and other SDH transmission equipment comprises a setting information detection part which detects the setting information transferred from one SDH transmission equipment and a second line switching control part which performs a line switching control at own side in accordance with the setting information detected by the setting information detection part.

Accordingly, with the SDH transmission system of the present invention, setting information on the line switching control between the work line and the protection line in one SDH transmission equipment can be transferred as setting information on other opposite side SDH transmission equipment so that mere setting of setting information at one SDH transmission equipment provides the same setting of setting information at other SDH transmission equipment. With such a provision, following advantages are brought about.

(1) The disagreement of setting information per se at respective SDH transmission equipment can be prevented so that it is no more necessary to perform a special processing for solving the disagreement of setting information at respective SDH transmission equipment and the normal line switching control can be always performed between opposite side equipment.

(2) It is no more necessary to perform a line switching control for a plurality of SDH transmission equipment at respective SDH transmission equipment individually so that a burden incurred by the line switching control setting operation can be drastically reduced.

(3) The setting information on a plurality of SDH transmission equipment can be integrally administrated at one SDH transmission equipment so that the system can extremely easily cope with the alteration of the setting information.

In the above SDH transmission system, the setting information transfer part of one SDH transmission equipment may transfer setting information to other SDH transmission equipment by storing the setting information into the transmission frame and the setting information detection part of other SDH transmission equipment may preferably detects the setting information which is transferred while having been stored in the transmission frame.

In this manner, by transferring the setting information to other SDH transmission equipment while storing information in the transmission frame, the transfer of the setting information can be performed with the SDH transmission system having a simple configuration.

Furthermore, other SDH transmission equipment may preferably be provided with a setting information re-transfer part which transfers the setting information detected by the setting information detection part to an SDH transmission equipment other than the above-mentioned one SDH transmission equipment as setting information on the line switching control of such other SDH transmission equipment.

Accordingly, by merely setting the setting information to the SDH transmission equipment which transfers the setting information, the same setting information is set at a plurality of other SDH transmission equipment so that a burden incurred by a setting operation for the line switching operation can be drastically reduced.

The present invention also discloses an SDH transmission equipment which is connected with other SDH transmission equipment while facing other transmission equipment through a work line which transmits a transmission frame conforming to the SDH transmission method and a protection line which functions as a backup for the work line, wherein setting information on a line switching control between the work line and the protection line is set and the SDH transmission equipment comprises a first line switching control part which performs the line switching control in accordance with the setting information on the line switching control and a setting information transfer part which transfers the setting information to other SDH transmission equipment as setting information on a line switching control at other SDH transmission equipment.

With such a configuration, the SDH transmission equipment can obtain advantages similar to those advantages set forth in the above-mentioned paragraphs (1) to (3).

The setting information transfer part may preferably be configured such that the setting information can be transferred while being stored in the transmission frame. For example, the setting information transfer part may be constructed such that the setting information is stored in a section overhead of the transmission frame. In this case, the setting information may be stored in an undefined portion of the section overhead or in an unused portion of a predefined byte of the section overhead.

When the setting information is stored in the section overhead of the transmission frame, an existing overhead processing in the SDH transmission method can be utilized so that a storing processing of the setting information can be performed with an extremely simple configuration.

When the setting information is stored in the undefined portion of the section overhead, it ensures the reliable transfer of the setting information. Furthermore, when the setting information is stored in the unused portion of the predefined byte of the section overhead, the processing on existing predefined byte can be utilized so that the setting information can be stored with a further simplified configuration.

The setting information transfer part may be constructed such that the setting information is stored in a path overhead of the transmission frame. In this case, the setting information may preferably be stored by using an unused portion of a predefined byte of the path overhead.

Accordingly, even when a detecting portion of the section overhead at the reception side becomes abnormal, it does not affect the detection of the setting information so that the reliability of the transfer of the setting information is enhanced. Furthermore, when the setting information is stored by using an unused portion of a predefined byte of the path overhead, a processing on the existing predefined byte can be utilized so that the storing processing of the setting information can be realized with a simple configuration.

The present invention also discloses the SDH transmission equipment which is connected with a first other SDH transmission equipment while facing the first other SDH transmission equipment through a work line which transmits a transmission frame conforming to the SDH transfer method and a protection line which functions as a backup for the work line, wherein the SDH transmission equipment comprises a setting information detection part which detects setting information on a line switching control between the work line and the protection line at the first other SDH transmission equipment transferred from the first other SDH transmission equipment and a second line switching control part which performs a line switching control at own side in accordance with the setting information detected by the setting information detection part.

With such a configuration, the SDH transmission equipment can obtain advantages similar to those advantages set forth in the above-mentioned paragraphs (1) to (3).

In the above mentioned SDH transmission equipment, the setting information detection part may preferably detects the setting information transferred from the first SDH transmission equipment having been stored in the transmission frame. For example, the setting information detection part may be constructed so as to detect the setting information stored in a section overhead of the transmission frame. In this case, it may be possible to detect the setting information stored in an undefined portion of the section overhead. It may be also possible to detect the setting information stored in an unused portion of a predefined byte of the section overhead.

When the setting information detection part of the SDH equipment detects the setting information while having been stored in the transmission frame, the detection of the setting information can be performed with a simple configuration. Furthermore, when the setting information detection part detects the setting information stored in the section overhead of the transmission frame, an existing overhead processing of the SDH transmission method can be utilized so that the detection processing of the setting information can be performed with an extremely simple configuration.

When the setting information detection part detects the setting information stored in the undefined portion of the section overhead, the setting information detection part can assuredly detect the setting information. Furthermore, when the setting information detection part detects the setting information stored in the unused portion of the predefined byte of the section overhead, an existing predefined byte processing can be utilized so that the detection processing of the setting information can be performed with a further simplified configuration.

Furthermore, the setting information detection part may preferably be constructed such that it can detect the setting information stored in the path overhead of the transmission frame. In this case, it is preferable to detect the setting information stored in an unused portion of a predefined byte of the path overhead.

When the setting information detection part detects the setting information stored in the path overhead of the transmission frame, even when the detecting part for the section overhead becomes abnormal, it does not affect the detection of the setting information so that the setting information can be detected normally. Furthermore, when the setting information detection part detects the setting information stored by using an unused portion of a predefined byte of the path overhead portion, an existing predefined byte processing can be utilized so that the detection processing of the setting information can be performed with a simple configuration.

The SDH transmission equipment may also preferably be provided with a setting information re-transfer part to transfer the setting information detected by the setting detection part to a second SDH transmission equipment other than the first SDH transmission equipment as setting information on a line switching control at the second SDH transmission equipment.

In this case, the setting information re-transfer part may also preferably be constructed such that it can transfer the setting information by storing the setting information into the transmission frame to the second SDH transmission equipment. For example, the setting information may preferably be stored in the section overhead of the transmission frame. In this case, the setting information may be stored in the undefined portion of the section overhead or in the unused portion of the section overhead.

The setting information re-transfer part may preferably be constructed such that the setting information is stored in the path overhead of the transmission frame. In this case, it is also preferable to store the setting information by using an unused portion of a predefined byte of the path overhead.

The present invention also discloses a line switching control method in an SDH transmission system which includes at least two SDH transmission equipments which use a transmission frame conforming to the SDH transmission method and where respective SDH transmission equipments are connected through a work line which transmits the transmission frame and a protection line which functions as a backup for the work line, wherein setting information at one SDH transmission equipment on a switching control between the work line and the protection line is transferred from one SDH transmission equipment to the other SDH transmission equipment and the other SDH transmission equipment performs its own line switching operation in accordance with the setting information transferred from the one SDH transmission equipment.

With such a configuration, the line switching control method in an SDH transmission system can also obtain advantages similar to those advantages set forth in the above-mentioned paragraphs (1) to (3).

In the above line control method, the other SDH transmission equipment may further transfer the setting information to an SDH transmission equipment other than one SDH transmission equipment for a line switching control of this SDH transmission equipment. In this case, the setting information may preferably be transferred by being stored in a transmission frame.

Furthermore, in this case, when the setting information is transferred to the second SDH transmission equipment by being stored in the section overhead (e.g. undefined byte or unused portion of predefined byte) or the path overhead (e.g. an unused portion of predefined byte) of the transmission frame, the previously mentioned operations and advantages are obtained.

BRIEF DESCRIPTION OF THE DRAWINGS

FIG. 4 is an explanatory view showing a bit configuration of K1 byte of SOH.

FIG. 5 is an explanatory view showing a bit configuration of K2 byte of SOH.

DESCRIPTION OF THE PREFERRED EMBODIMENTS (a) Explanation of one Embodiment of the Present Invention The embodiment of the present invention is explained hereinafter in conjunction with attached drawings.

Figure 1:
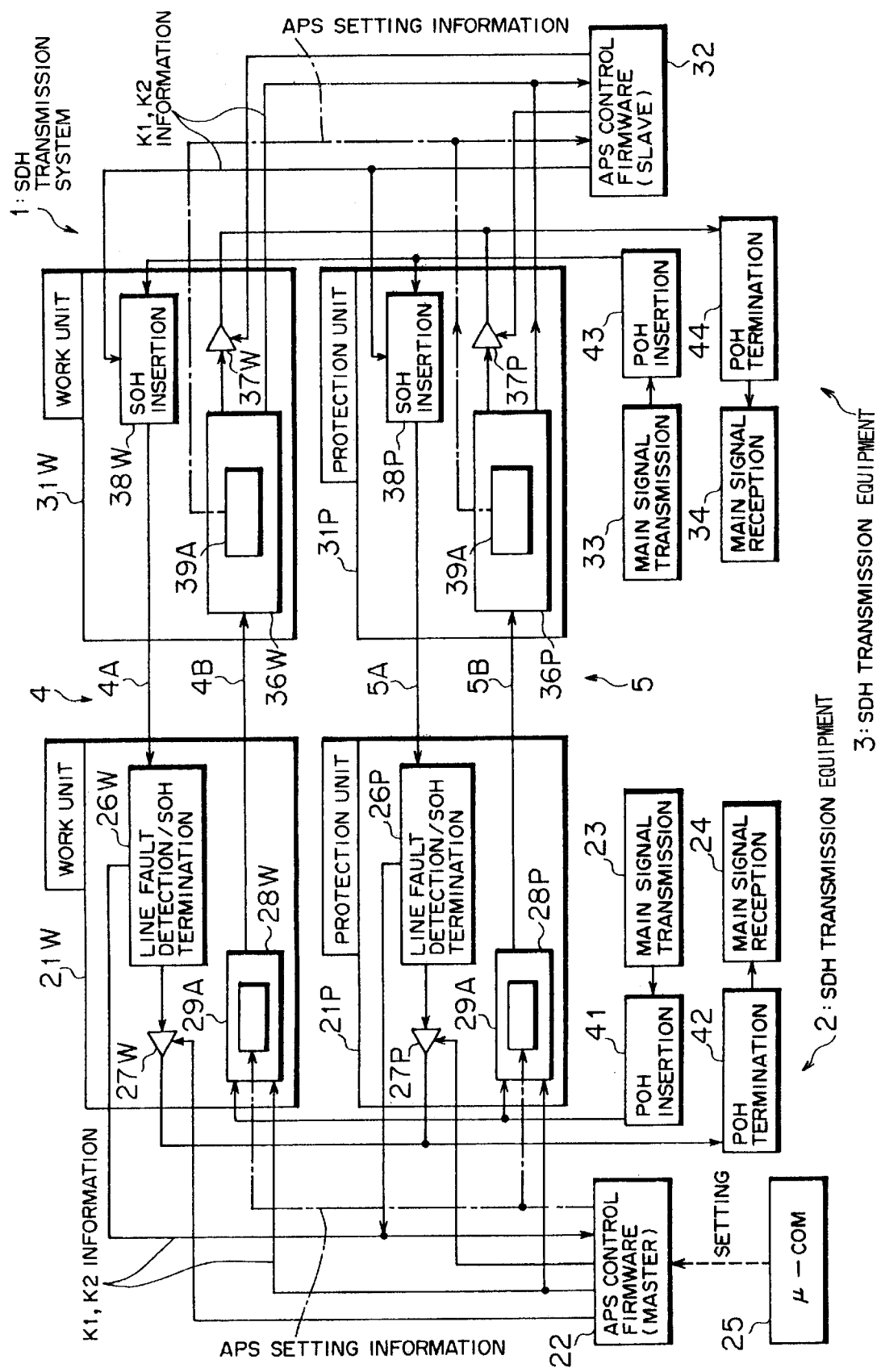
FIG. 1 is a block diagram showing an SDH transmission system to which SDH transmission equipment of one embodiment according to the present invention are applied.

In FIG. 1, an SDH transmission system to which SDH equipment of the embodiment of the present invention are applied is shown as a block diagram. In the SDH transmission system 1 shown in FIG. 1, as in the case of the previously mentioned SDH transmission system 100 in view of FIG. 10, an SDH transmission equipment 2 and an SDH transmission equipment 3 are connected while facing each other through a work line 4 (a down-line 4A and an up-line 4B) and a protection line 5 (a down-line 6A and an up-line SB). The SDH transmission equipment 2 (3) is provided with a work unit 21W (31W), a protection unit 21P (31P), and APS control firmware 22 (32). The SDH transmission equipment 2 (3) is also provided with a main signal transmission part 23 (33), a main signal reception part 24 (34), a POH insertion processing part 41 (43), and a POH termination processing part 42 (44), wherein these parts have the similar configuration as those parts explained previously in view of FIG. 10

Figure 11:
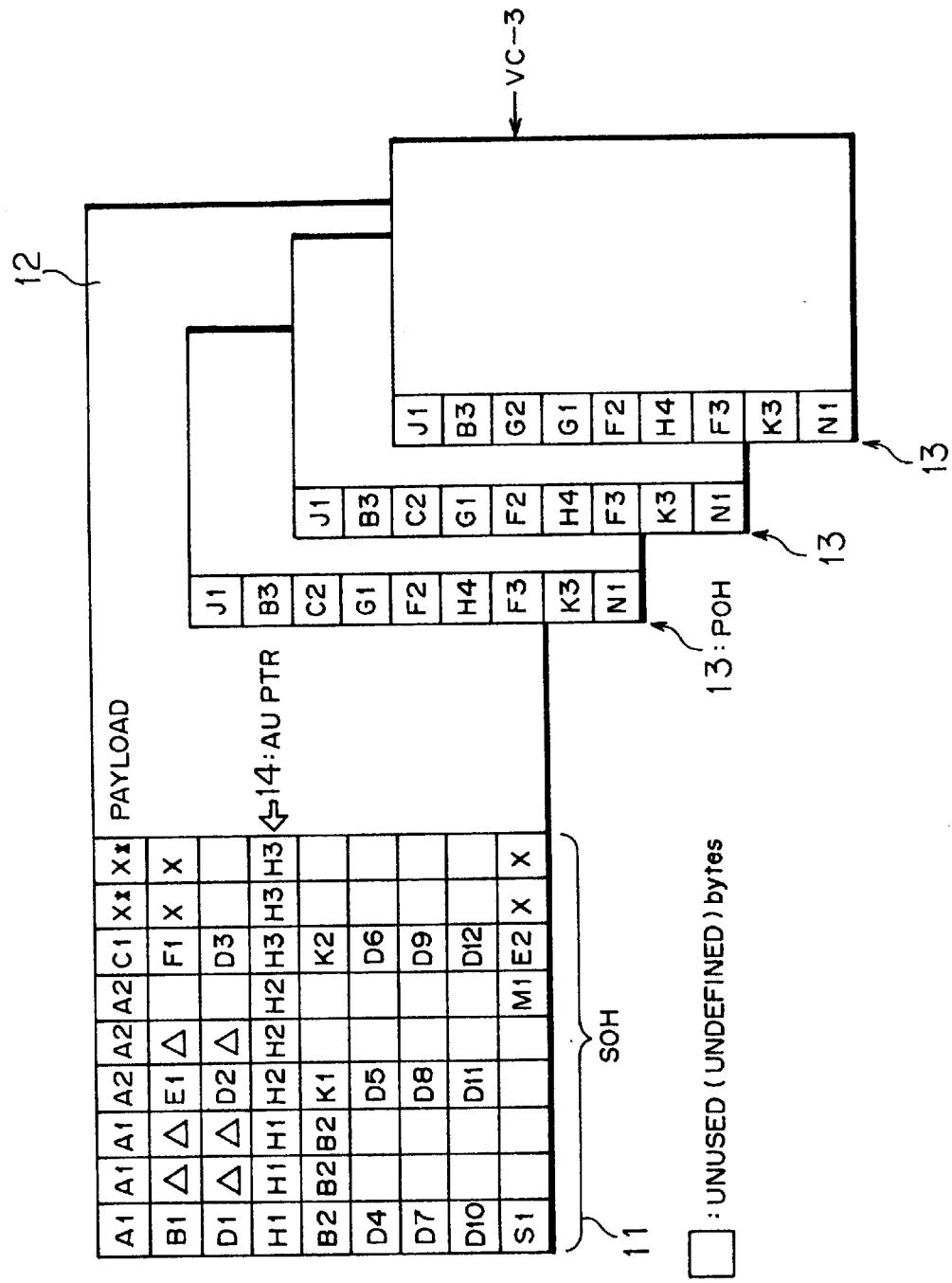
FIG. 11 is an explanatory view showing the frame format in the SDH transmission method.

In the above SDH transmission system, the work units 21W (31W) is provided for performing a transmission processing of the transmission frame having the frame format (STM or STS) through the work line 4, wherein the transmission frame is explained previously in view of FIG. 11, while the protection unit 21P (31P) is provided for performing a transmission processing of the transmission frame through the protection line 5 in lieu of the work line 4 when a fault occurs on the work line 4.

The APS firmware [first (second) line switching control part] 22 (32) (hereinafter simply referred to as "firmware 22 (32)") performs an APS control at the time of occurrence of a line fault in accordance with setting information (APS setting information) on the line switching control between the work units 21W (31W) (the work line 4) and the protection units 21P (31P) (the protection line 5).

In this embodiment, however, at the time of starting the system or at the time of changing the APS setting information by a maintenance man or a maintenance command, the APS setting information is set only to the firmware 22 of the SDH transmission equipment 2 through a microcomputer (μ-COM) 25 and setting of the APS setting information to the firmware 32 of the SDH transmission equipment 3 is performed, as explained later, by transferring the APS setting information set to the firmware 22 of the SDH transmission equipment 2 to the SDH transmission equipment 3.

Figure 10:
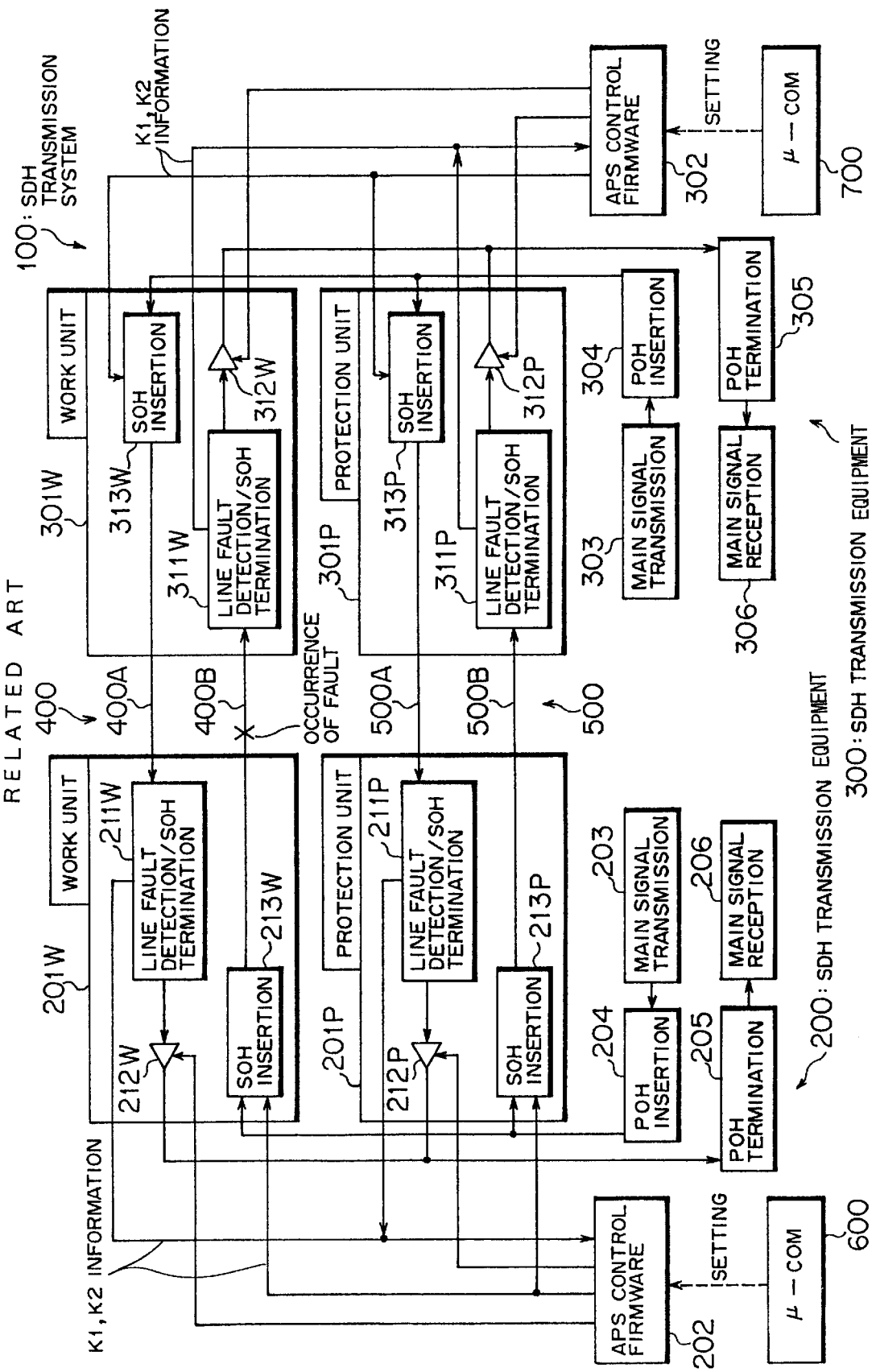
FIG. 10 is a block diagram of detailed configuration of the SDH transmission system while focusing on the APS control function of the SDH transmission system (SDH transmission equipment).

Accordingly, as shown in FIG. 1, the work unit 21W (the protection unit 21P) at the SDH transmission equipment 2 which is provided with a line fault detection/SOH termination part 26W (26P), a high impedance switching part 27W (27P) and an SOH insertion processing part 28W (28P) as explained in view of FIG. 10 is further provided with APS setting information insertion part 29A at the SOH insertion processing part 28W (28P).

Figure 2:
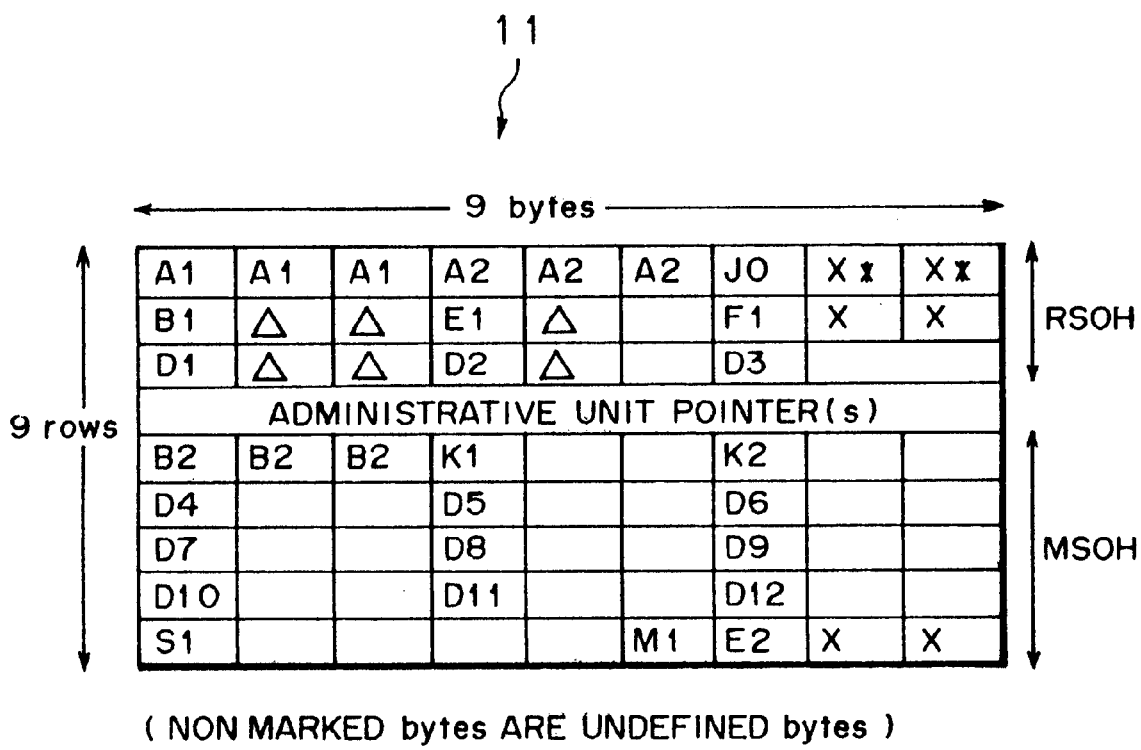
FIG. 2 is an explanatory view showing a format of SOH in the SDH transmission method.

At the time of starting the system, the APS setting information insertion parts 29A receive the APS setting information from the firmware 22 when the SOH 11 is inserted to the main signal to which the POH 13 is already inserted by the POH insertion processing part 41 and insert the APS setting information to an idle region (undefined byte or non-marked byte in FIG. 2) of the SOH 11 so that the APS setting information set to the firmware 22 is stored in a transmission frame and is transferred to the SDH transmission equipment 3 (the firmware 32) which forms an opposite side equipment as an APS setting information at the SDH transmission equipment 3.

In this embodiment, although the same APS setting information is transferred to the SDH transmission equipment 3 through the protection line 5 as well as the work line 4 since the APS setting information insertion parts 29A are provided to the work unit 21W and the protection unit 21P respectively, the SDH transmission equipment 3 selects either one of the APS setting information from these lines in the same manner as it switches or selects the reception terminal of the main signal.

On the other hand, the work unit 31W (the protection unit 31P) at the SDH transmission equipment 3 which is provided with a line fault detection/SOH termination part 36W (36P), a high impedance switching part 37W (37P) and an SOH insertion processing part 38W (38P) as explained in view of FIG. 10 is further provided with APS setting information insertion parts 39A at the line fault detection/SOH termination part (hereinafter simply referred to as 'termination part' 36W (36P).

Here, these APS setting information termination parts (the setting information detection parts) 39A terminate the SOH 11 of the reception-side transmission frame and detect the APS setting information inserted to the undefined byte of the SOH 11 of the transmission frame by the APS setting information insertion part 29A and transferred from the SDH transmission equipment (first SDH transmission equipment) 2. The detected APS setting information is then transferred and set to the firmware (the line switching control part) 32.

Namely, the SDH transmission system 1 according to this embodiment uses one SDH transmission equipment 2 as a master equipment on the APS setting information and the other SDH transmission equipment 3 as a slave equipment which is dependent on the SDH transmission equipment 2, and at the time of starting the system, the APS setting information is transferred from the master equipment 2 to the slave equipment 3 so that the APS setting information at the SDH transmission equipment 3 is made to agree with the APS setting information at the SDH transmission equipment 2.

The operation of the SDH transmission system 1 having the above-mentioned configuration is hereinafter explained in detail.

For example, when the system 1 is started, the APS setting information is outputted from the firmware 22 of the master equipment 2 and is sent to respective APS setting information insertion parts 29A of the work unit 21W and the protection unit 21P. Then, respective APS setting information insertion parts 29A insert the received APS setting information to the SOH 11 of the transmission frames addressed to the slave equipment 3. Accordingly, the respective transmission frames are transmitted to the slave equipment 3 through the work line 4 and the protection line 5.

On the other hand, in the slave equipment 3, the transmission frames are received by the termination parts 36W, 36P respectively and the APS setting information termination parts 39A terminate the SOH 11 of the received transmission frames and detect the APS setting information inserted into the undefined byte of the SOH 11 at the master equipment 2. Then, the detected APS setting information are-transferred to the firmware 32 respectively and the firmware 32 selectively receives one (having a better signal quality, for example) from these APS setting information.

When a fault occurs on the work line 4 or the protection line 5 at the time of starting the system or at the time of changing the APS setting information by the maintenance command, the APS setting information which is stored in the transmission frame (the undefined byte of the SOH 11) and is received through the work line 4 or the protection line 5 which is free from the fault is automatically received by and set to the firmware 32.

In this manner, the same APS setting information set at the firmware 22 of the master equipment 2 can be set at the firmware 32 of the slave equipment 3 so that there is no possibility of the occurrence of the disagreement of setting such as a mode mismatch. Accordingly, at the time of occurrence of a line fault, the SDH transmission equipment 2, 3 can respectively perform the same APS control so that the normal line relief control can be performed always. Since the APS control per se is performed almost in the same manner as the conventional manner, the detailed explanation thereof is omitted.

As described above, according to the SDH transmission system 1 of this embodiment, the APS setting information at the master equipment 2 can be transferred as the APS setting information for the opposite slave equipment 3 so that by merely setting the APS setting information to the master equipment 2, the same APS setting information can be set to the slave equipment 3. Accordingly, the SDH transmission system 1 of this embodiment can obtain following advantages.

(1) The occurrence of disagreement of APS setting information per se at respective SDH transmission equipment 2, 3 can be prevented so that it is no more necessary to perform a special processing as in the past for solving the disagreement of respective APS setting information and the normal APS control (the line relief control) can be performed always at the time of occurrence of a line fault between the SDH transmission equipment 2 and the opposite side SDH transmission equipment 3.

(2) It is no more necessary to perform setting of APS control individually to the SDH transmission equipment 2, 3 at the SDH transmission equipment 2, 3 respectively so that the burden on the maintenance man for setting the APS control can be drastically reduced.

(3) Since the APS setting information at respective SDH transmission equipment 2, 3 can be collectively administrated by one SDH transmission equipment 2 (the master equipment), even when the APS setting information is to be changed, it is unnecessary to perform the changing operation at respective SDH transmission equipment 2, 3 for example and accordingly, the SDH transmission system 1 can cope with the changing of the APS setting information in an extremely flexible manner.

Furthermore, in the master equipment 2 of this embodiment, the APS setting information insertion part 29A is provided to the OH insertion processing part 28W (28P) so that making use of the existing OH insertion processing, the APS setting information can be stored in the undefined byte of the SOH 11 of the transmission frame and can be transferred to the slave equipment 3 thus realizing the reliable transfer of the APS setting information with an extremely simple configuration.

In this case, since the slave equipment 3 is also provided with the APS setting information termination part 39A at the termination part 36W (36P) having an OH termination function, the existing OH termination processing can be utilized for detecting the APS setting information transferred having been stored in the transmission frame of SOH 11 thus realizing the reliable detection of the APS setting information with an extremely simple configuration.

Furthermore, according to this embodiment, since the units 21W, 21P in the master equipment 2 are respectively provided with the APS setting information insertion parts 29A, while the unit 31W, 31P disposed at the slave equipment 3 are respectively provided with the APS setting information detection parts 39A, even when a line fault occurs on either one of the lines 4, 5 at the time of transferring the APS setting information, the transfer of the APS setting information can be normally performed through the line 4, 5 which is free from such a line fault. Namely, the redundancy of the transfer processing can be obtained with respect to the APS setting information. Accordingly, the reliability of setting the APS control can be enhanced.

The APS setting information insertion parts 29A (the APS setting information detection parts 39A) may be provided to either one of the work unit 21W (31W) and the protection unit 21P (31P) and such a configuration can also enjoy at least the prevention of the disagreement of the setting, the reduction of the burden on the setting operation and the flexibility in changing the setting as set forth in the above-mentioned paragraphs (1) to (3).

(b) Explanation of the First Modification

Figure 3:
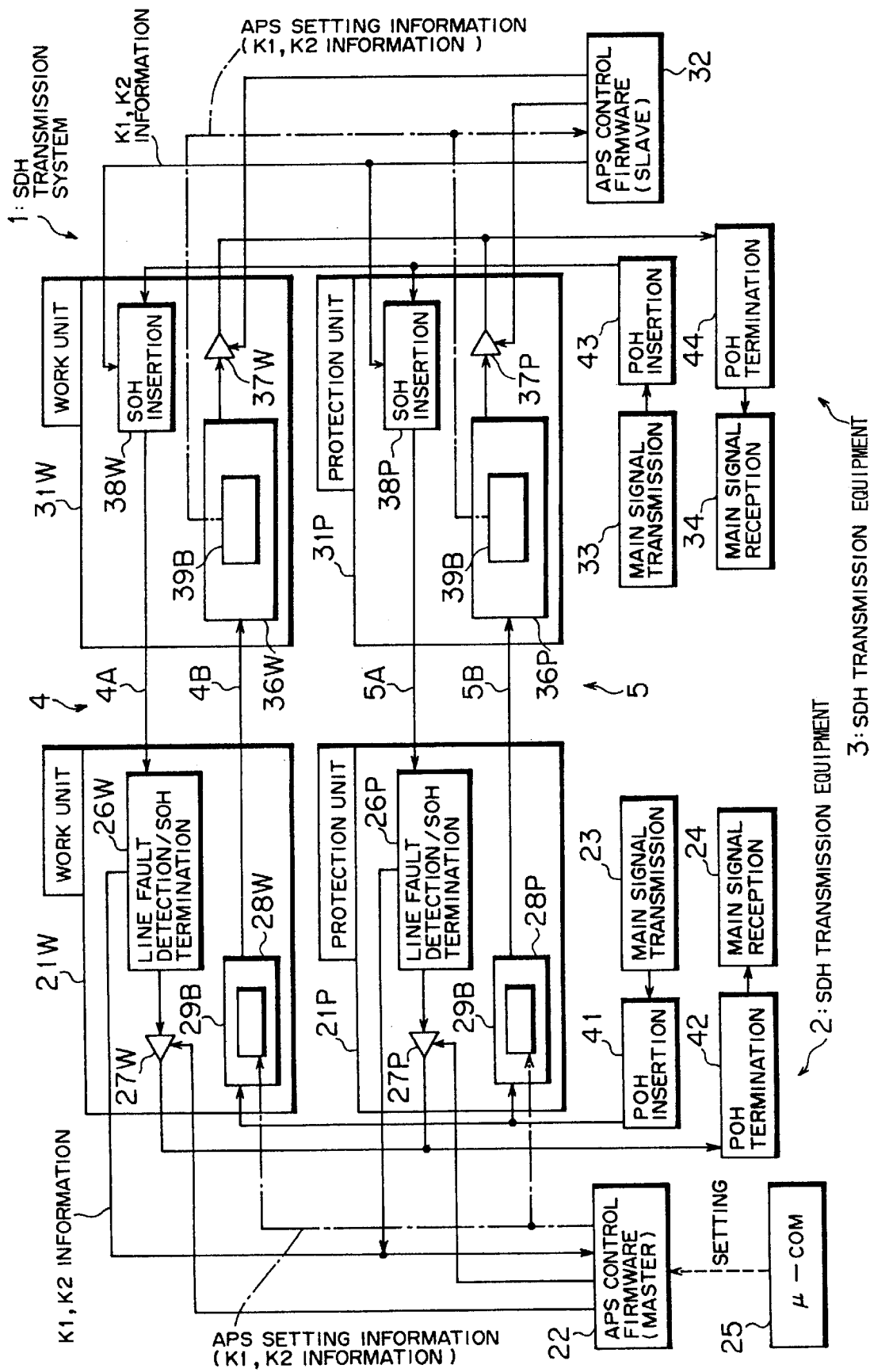
FIG. 3 is a block diagram showing the first modification of the SDH transmission system of the embodiment according to the present invention.

FIG. 3 shows the first modification of the above-mentioned SDH transmission system as a block diagram, the SDH transmission system 1 shown in FIG. 3 is different from the SDH transmission system 1 shown in FIG. 1 in that it is provided with APS setting information insertion parts 29B in place of the APS setting information insertion parts 29A at the OH insertion processing parts 28W, 28P of the master equipment 2 and also is provided with APS setting information detection parts 39B in place of the APS setting information detection parts 39A at the line fault detection/OH termination part 36W, 36P of the slave equipment 3.

Here, the APS setting information insertion parts 29B in the master equipment 2 receive the APS setting information from the firmware 22 at the time of starting the system and thereafter insert or store the APS setting information into the transmission frame and transfer the APS setting information to the slave equipment 3 which constitutes the opposite side equipment. In this first modification, at the time of inserting the SOH 11 into the main signal, the insertion is made to the predefined byte (e.g. K1 byte or K byte) but not to undefined byte of the SOH 11.

To be more specific, the APS setting information insertion parts 29B insert the APS setting information into the K1 byte or the K byte which is predefined byte using the unused codes of the K1 byte having the bit configuration shown in FIG. 4 or the K byte having the bit configuration shown in FIG. 5.

For example, when the APS setting information is inserted to the K1 byte, as shown in the following table 1, since "1001", "0111", "0011" and the like among various codes expressed by a switching (SW) request type (4 bits) are unused or undefined so that the APS setting information can be inserted into the K1 byte using these unused codes.

TABLE 1

| Switch Request Type (4 bits) | |
| --- | --- |
| CODE | Function |
| 1 1 1 1 | Lock-out of Protection |
| 1 1 1 0 | Forced Switch |
| 1 1 0 1 | Signal Fail High Priority |
| 1 1 0 0 | Signal Fail Low Priority |
| 1 0 1 1 | Signal Degrade High Priority |
| 1 0 1 0 | Signal Degrade Low Priority |
| 1 0 0 1 | (Not Used) |
| 1 0 0 0 | Manual Switch |
| 0 1 1 1 | (Not Used) |
| 0 1 1 0 | Wait to Restore |
| 0 1 0 1 | (Not Used) |
| 0 1 0 0 | Exerciser |
| 0 0 1 1 | (Not Used) |
| 0 0 1 0 | Reverse Request |

TABLE 1-continued

Switch Request Type (4 bits)

| CODE | Function |
| --- | --- |
| 0 0 0 1 | Do not Revert |
| 0 0 0 0 | No Request |

When the APS setting information is inserted to the K2 byte, as shown in the following table 2, since "000", to "101" and the like among various codes expressed by "others" (3 bits) are unused (undefined) so that the APS setting information can be inserted into the K2 byte using these unused codes.

TABLE 2

Others (3 bits)

| CODE | Function |
| --- | --- |
| 1 1 1 | Line AIS |
| 1 1 0 | Line FERF |
| 1 0 1 | Reserve |
| 1 0 0 | Reserve |
| 0 1 1 | Reserve |
| 0 1 0 | Reserve |
| 0 0 1 | Reserve |
| 0 0 0 | Reserve |

The APS setting information detection parts 39B in the slave equipment 3 detects the APS setting information which is stored in the SOH 11 utilizing the unused codes of the K1 byte or the K2 byte by the APS setting information insertion parts 29B of the master equipment 2 and is transferred to the slave equipment 3.

With such a configuration, the SDH transmission system 1 of this first modification also can transfer the APS setting information at the master equipment 2 as the APS setting information at the opposite slave equipment 3 by utilizing the unused codes of the K1 byte or the K2 byte thus obtaining the same operation and advantages obtained by the system 1 shown in FIG. 1.

Especially, in this modification, the utilization of the unused codes of the K1 byte or the K2 byte which is predefined byte can realize the insertion/detection processing of the APS setting information using the existing insertion/termination processing of the K1 or K2 byte so that it is no more necessary to provide units exclusively used for an APS setting information insertion/detection purpose as additional parts. Accordingly, the insertion/detection function of the APS setting information can be achieved with an extremely simple configuration.

The above-mentioned APS setting information insertion part 29B (the APS setting information detection parts 39B) may be provided to either one of the work unit 21W (31W) and the protection unit 21P (31P) as in the case of the embodiment described above. The APS setting information may be inserted into any byte of the SOH 11 in the same manner as the K1 and K2 byte provided that there is an unused portion (unused bits or codes, etc).

(c) Explanation of the Second Modification

Figure 6:
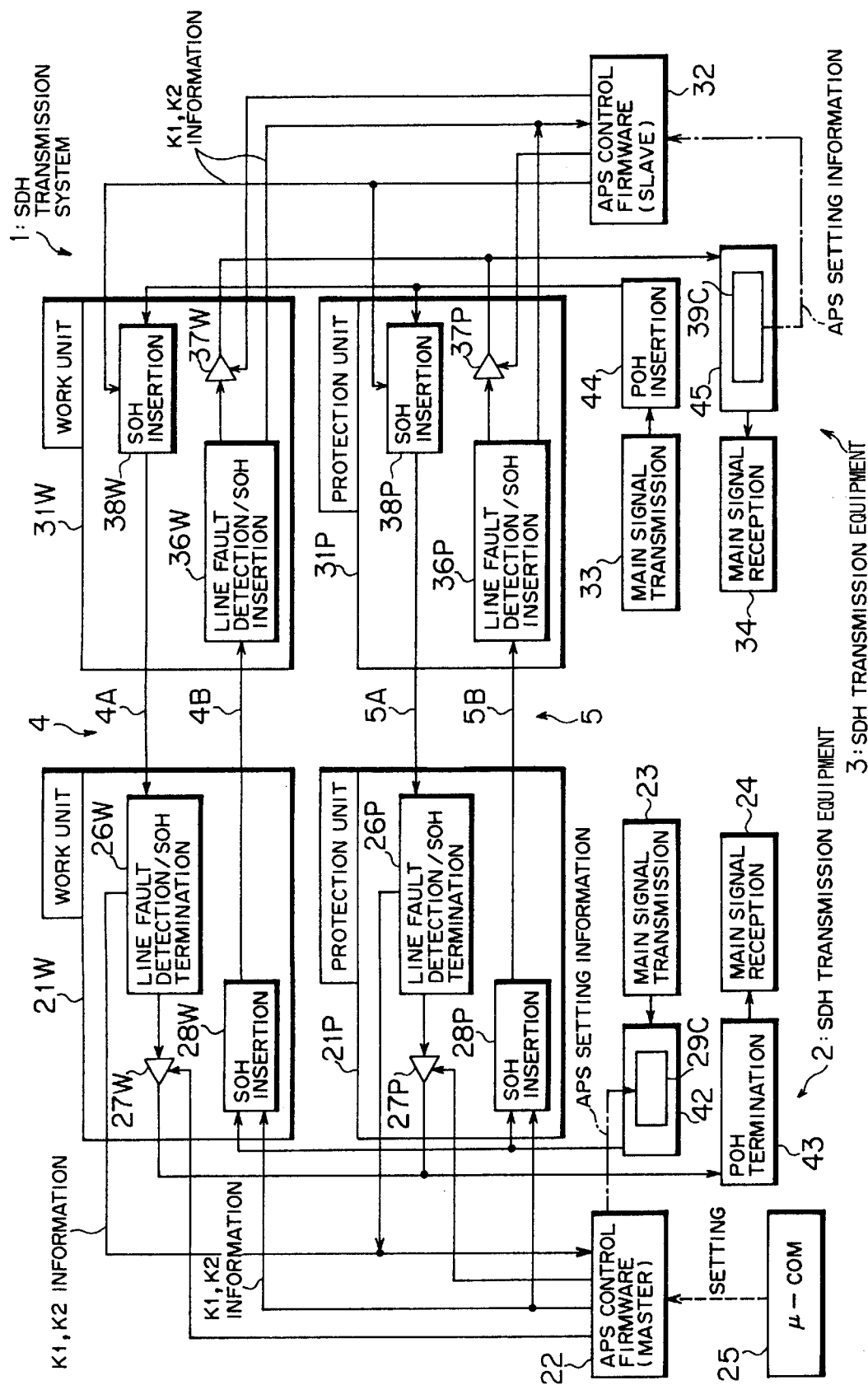
FIG. 6 is a block diagram showing the second modification of the SDH transmission system of the embodiment according to the present invention.

In FIG. 6, the second modification of the SDH transmission system described in view of FIG. 1 is shown as a block diagram. As shown in FIG. 6, this SDH transmission system 1 differs from the system 1 as described heretofore in view of FIG. 1 in that an APS setting information insertion part 29C is provided to the POH insertion processing part 42 of the master equipment 2 and an APS setting information termination part 39C is provided to the POH termination processing part 45 of the slave equipment 3 without providing the APS setting information insertion part 29A and the APS setting information termination part 39A to the SOH insertion processing part 28W (28P) and the termination part 36W (36P).

Here, at the time of starting the system, the APS setting information insertion part 29C of the master equipment 2 receives the APS setting information from the firmware 22 to insert the POH 13 to the main signal sent from the main signal sending part 24 and insert this APS setting information into the POH 13 (refer to FIG. 7) so as to store the APS setting information in the transmission frame and transfer the APS setting information to the slave equipment 3.

Figure 7:
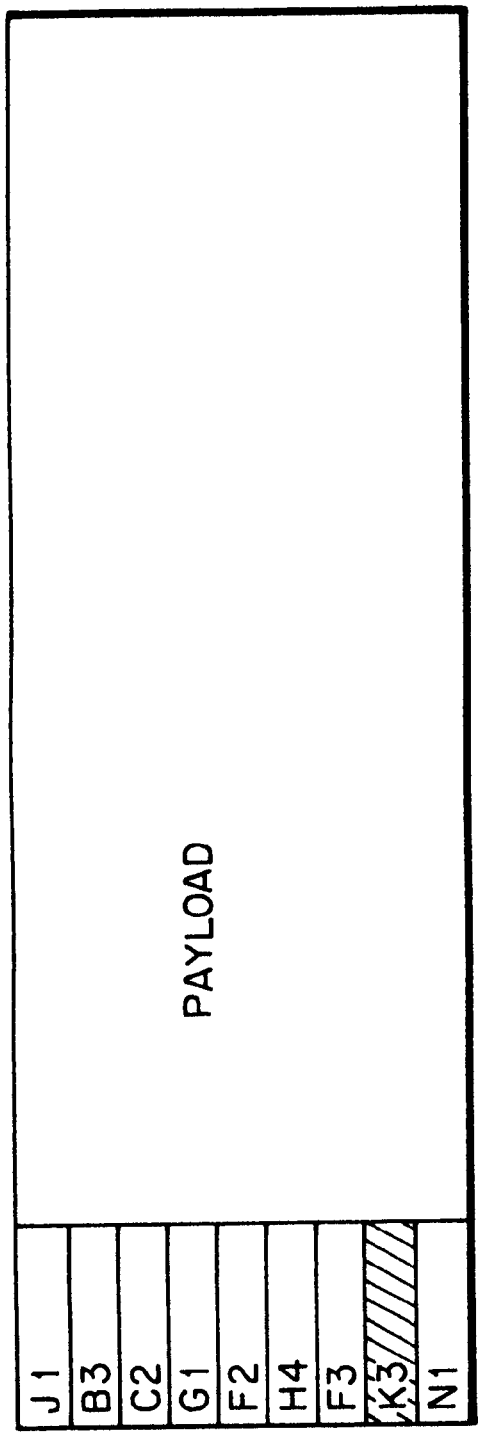
FIG. 7 is an explanatory view showing a frame format of VC-4 in the SDH transmission method.

To explain in more detail, in the APS setting information insertion part 29C of this second modification at the POH 13 of the VC-4, for example, since four bits in total which comprise bit numbers 5, 6, 7 and 8 are not yet used or undefined out of K3 byte where the defined byte is hatched as shown in FIG. 7, the ASP setting information is inserted into the POH 13 using the undefined portion. Incidentally, different from the SOH 11, there are no undefined byte in the POH 13 and all the byte are basically defined in any way so that only the unused portions of the defined byte may be available.

The APS setting information termination part 39C of the slave equipment 3 detects the APS setting information which is stored in the POH 13 of the transmission frame using the unused portions of the POH 13 by means of the APS setting information insertion part 29C of the master equipment 2 and is transferred to the slave equipment 3.

With such a configuration, the SDH transmission system 1 of this second modification also can transfer the APS setting information at the master equipment 2 as the APS setting information at the opposite side slave equipment 3 by utilizing the unused portions of the POH 13 (e.g. unused bits of K3) thus obtaining the same operation and advantages obtained by the system 1 of the above-mentioned first embodiment.

Especially, in this modification, the utilization of the POH 13 can realize the insertion/termination processing of the APS setting information using the existing insertion/detection processing of the POH 13 so that it is no more necessary to provide units exclusively used for an APS setting information insertion/detection purpose as additional parts. Accordingly, the insertion/detection function of the APS setting information can be achieved with an extremely simple configuration.

Furthermore, in this modification, even if a fault occurs at the termination part (termination part 36W, 36P) of the SOH 11 at the side of the slave equipment 3 by a chance, the POH termination processing part 39C can normally detects the APS setting information which is inserted into the POH 13 since the fault does not affect the detection of the APS information, the reliability of transfer of APS setting information is further enhanced.

The APS setting information can be inserted to any byte of the POH 13 as in the case of the above-mentioned K3 byte provided that there is an unused portion. For example, even when the F2, F3 byte are predefined as "users channel", they may be used with the client consent. It may be also possible to use byte which have a portion not used during some time slots such as J1 byte for a path trace) while limiting the use time.

The APS setting information may be inserted not only to the POH 13 but also to the SOH 11 (undefined byte or unused portion of the predefined byte). In this case, even when a fault occurs either on the termination function of the SOH 11 or on the termination function of the POH 13, the normal setting of the APS setting information is performed so that the reliability of the transfer processing of the APS setting information is further enhanced.

(d) Explanation of the Third Modification

Figure 8:
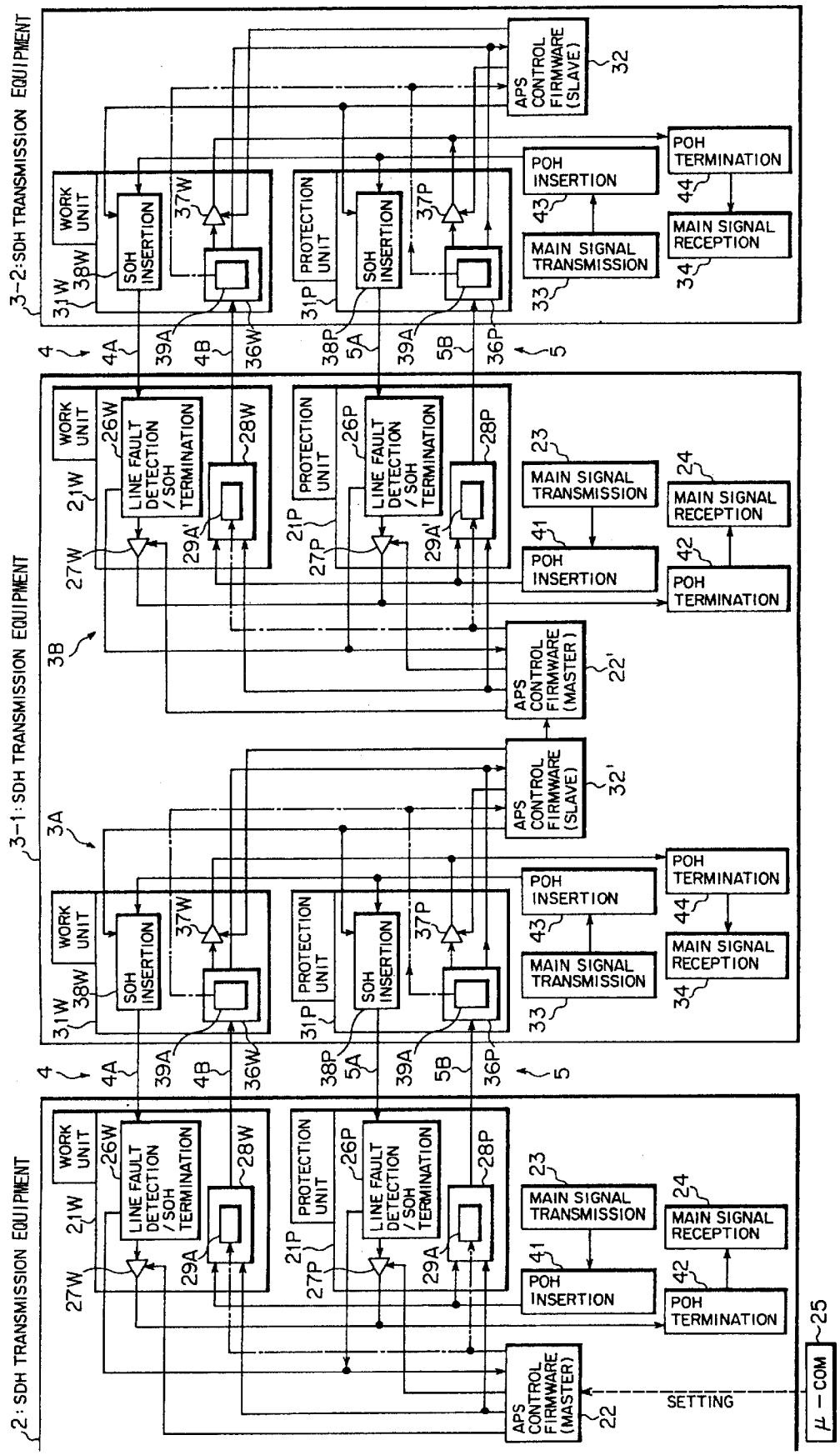
FIG. 8 is a block diagram of the third modification of the SDH transmission system of the embodiment according to the present invention.
Figure 9:
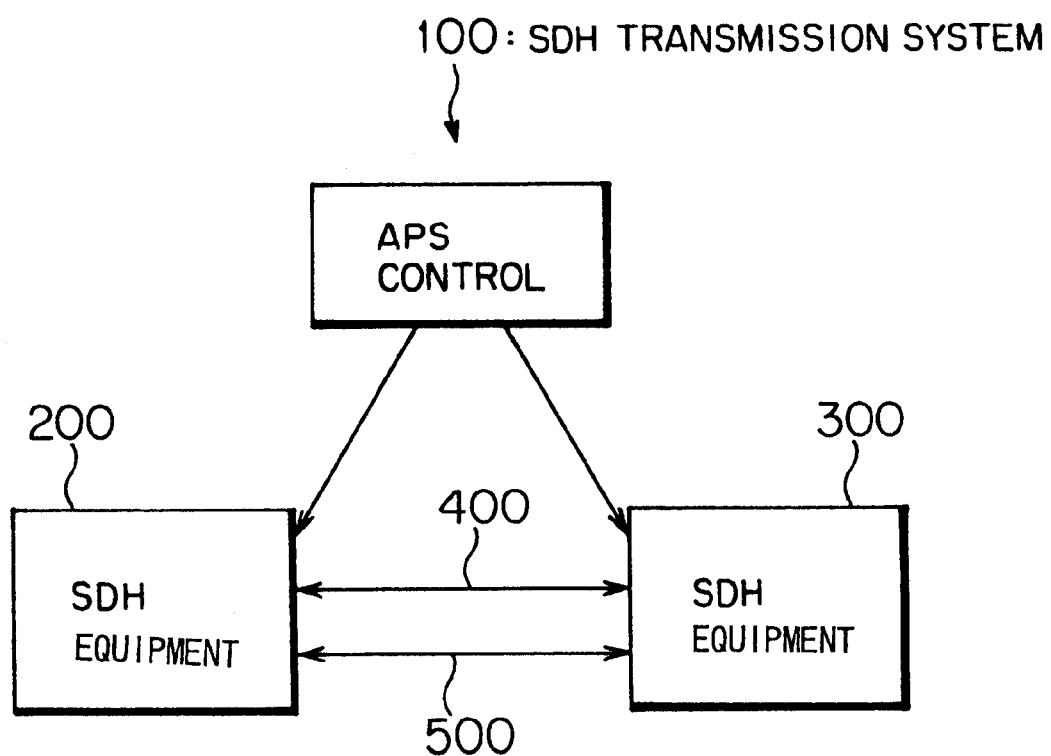
FIG. 9 is a block diagram explaining the APS control function of the SDH transmission system.

In FIG. 8, the third modification of the SDH transmission system of this embodiment is shown as a block diagram. As shown in FIG. 8, this SDH transmission system 1 comprises the above-mentioned SDH transmission equipment (master equipment) 2, an SDH transmission equipment 3-1 and an SDH transmission equipment 3-2 having the similar configuration as that of the SDH transmission equipment 3. The SDH transmission equipment 2 and the SDH transmission equipment 3-1 are connected through the work line 4 and the protection line 5, while the SDH transmission equipment 3-1 and the SDH transmission equipment 3-2 are also connected through another work line 4 and another protection line 5.

The SDH transmission equipment 3-1 includes the work unit 31W, the protection unit 31P, the firmware 32', the main signal transmission part 33, the main signal reception part 34, the POH insertion processing part 43 and the POH termination processing part 44 in the same manner as the SDH transmission equipment 3 shown in FIG. 1 as a transmission processing system 3A for performing the transmission processing between the SDH transmission equipment 3-1 and the SDH transmission equipment 2. The SDH transmission equipment 3-1 also includes the work unit 21W, the protection unit 21P with an exception of the APS setting information insertion parts 29A', the firmware 22', the main signal transmission part 23, the main signal reception part 24, the POH insertion processing part 41 and the POH termination processing part 42 in the same manner as the SDH transmission equipment 2 shown in FIG. 1 as a transmission processing system 3B for performing the transmission processing between the SDH transmission equipment 3-1 and the SDH transmission equipment 3-2.

In this modification, however, the firmware 32' of the transmission processing system 3A sets the APS setting information which is detected and set by the APS setting information termination parts 39A to the firmware 22' of the transmission system 3B. In this manner, the firmware 22' outputs the setting information set by the firmware 32' to the APS setting information insertion part 29A' of the transmission system 3B. These firmware 32', 22' may be formed as a common unit.

Namely, the SDH transmission equipment 3-1 is provided with the APS setting information insertion parts 29A' as APS setting information re-transfer parts which transfer the APS setting information detected by the APS setting information termination parts 39C of the transmission processing system 3A to the SDH transmission equipment 3-2 excluding the SDH transmission equipment 2 as the APS setting information for other SDH transmission equipment 3-2. In this case, as in the case of the SDH transmission equipment 2, the APS setting information is stored in the transmission frame and is transferred to the SDH transmission equipment 3-2 by inserting the APS setting information to the undefined byte of the SOH 11.

In the SDH transmission system 1 of the third modification having the above-mentioned configuration, the APS setting information set to the firmware 22 of the master equipment 2 is inserted into the undefined byte of the SOH 11 and is transferred to the SDH transmission equipment 3-1 which works as a repeater slave equipment and then is set to the firmware 32' following the same steps as described previously in view of FIG. 1. Subsequently, the firmware 32' outputs the APS setting information to the firmware 22' and the firmware 22' outputs the received APS setting information to the APS setting information insertion part 29A'.

Then, the APS setting information insertion parts 29A' respectively insert the APS setting information received from the firmware 22' to the undefined byte of the SOH 11 and transfer such an APS setting information to the SDH transmission equipment 3-2 which works as the slave equipment. In the slave equipment 3-2, the APS setting information termination parts 39A detect the APS setting information inserted into the undefined byte of the SOH 11 in the slave equipment 3-1 and transferred to the SDH transmission equipment 3-2 in the same manner as the SDH transmission equipment 3 and set the detected APS setting information to the firmware 32.

As a result, the same APS setting information set to the firmware 22 of the master equipment 2 is respectively set to the firmware 32', 22' of the repeater slave equipment 3-1 and the firmware 32 of the slave equipment 3-2.

As described heretofore, according to the SDH transmission system 1 (the SDH transmission equipment 3-1) of this third modification, since the APS setting information which is transferred from the master equipment 2 is further transferred to other slave equipment 3-2, by merely setting the APS setting information to the master equipment 2, the same APS setting information can be set to a plurality of other SDH transmission equipment 3-1, 3-2. Accordingly, it is no more necessary to perform the setting of the APS control to respective SDH equipment 2, 3-1, 3-2 thus enabling a further drastic reduction of burden incurred by the APS setting operation as compared with the previously mentioned system 1.

Although, the above-mentioned third embodiment is described in view of the case where three SDH equipment 2, 3-1, 3-2 are connected in series while facing each other, an integral setting of the APS control from one SDH transmission equipment (master equipment) to other SDH transmission equipment can be performed in the same manner even when more than four SDH transmission equipment are connected in series while facing each other.

Furthermore, in the above-mentioned third modification, although the APS setting information is inserted into the undefined byte of the SOH 11, the APS setting information may be inserted into the predefined byte (unused portion of K1, K2 byte) of the SOH 11 or the unused portion of the POH 13 as in the case of the above-mentioned first and second modifications. The locations where the APS setting information is inserted may be changed in respective transmission intervals (between the SDH transmission equipment 2 and 3-1 as well as between the SDH transmission equipment 3-1 and 3-2).

In the embodiments and modifications which have been described heretofore, although the APS setting information is transferred by being stored in the transmission frame, the present invention is not limited to this APS setting information transfer and may realize such an APS setting information transfer by providing a signal line which is exclusively used for the APS setting information transfer.

Furthermore, although the line relief control based on only one route (section or path) has been explained in the above embodiments and the modifications, in actual operation, a plurality of routes are provided to respective SDH transmission equipment 2, 3, 3-1, 3-2 and the line relief control is performed on respective routes individually based on the APS setting information sent from the respective higher order equipment 2 and 3-1.

The present invention is not limited to the embodiments and the modifications which have been described heretofore and various modifications may be made and put into practice without departing from the spirit of the present invention.

What is claimed is:

1. An SDH transmission system provided with at least two SDH transmission nodes which are connected while facing each other through a work line which transmits a transmission frame conforming to an SDH transmission method and a protection line which functions as a backup for said work line, wherein said one SDH transmission node comprises a master mode setting part which sets one of a plurality of line switching modes setting information, which corresponds to one of route setting between the other SDH node and indicating a mode of said line switching control at its own side, a master line switching control part which performs a line switching control between said work line and said protection line in accordance with a set line switching mode setting information indicating a mode of said line switching control at its own side and a setting information transfer part which transfers said line switching mode setting information to said other SDH transmission node, and said other SDH transmission node comprises a setting information detection part which detects said line switching mode setting information transferred from said one SDH transmission node, a slave mode setting part which sets a line switching mode at its own side in accordance with said line switching mode setting information corresponds to the one of route setting detected by said setting information detection part, and a slave line switching control part which performs a line switching control at its own side in accordance with said line switching mode set by said slave mode setting part.

2. An SDH transmission system according to claim 1, wherein said setting information transfer part of said one SDH transmission node transfers said setting information to said other SDH transmission equipment by storing said setting information into said transmission frame and said setting information detection part of said other SDH transmission node detects said setting information transferred from said one SDH transmission equipment having been stored in said transmission frame.

3. An SDH transmission system according to claim 1, wherein said other SDH transmission node is provided with a setting information re-transfer part which transfers said setting information detected by said setting information detection part to another SDH transmission node other than said one SDH transmission equipment as setting information on a line switching control on said another SDH transmission node.

4. An SDH transmission system according to claim 2, wherein said other SDH transmission node is provided with a setting information re-transfer part which transfers said setting information detected by said setting information detection part to another SDH transmission node other than said one SDH transmission equipment as setting information on a line switching control on said another SDH transmission node.

5. An SDH transmission node which is connected with another SDH transmission node while facing each other through a work line which transmits a transmission frame conforming to an SDH transmission method and a protection line which functions as a backup for said work line, wherein said SDH transmission node comprises a master mode setting part which sets one of a plurality of line switching modes setting information, which corresponds to one of route setting between the another SDH node and indicating a mode of said line switching control at its own side, a master line switching control part which performs a line switching control between said work line and said protection line in accordance with a set line switching mode setting information and a setting information transfer part which transfers said line switching mode setting information to said another SDH transmission node as line switching mode setting information on a line switching control at said another SDH transmission node.

6. An SDH transmission node according to claim 5, wherein said setting information transfer part transfers said setting information to said other SDH transmission node by storing said setting information into said transmission frame.

7. An SDH transmission node according to claim 6, wherein said setting information transfer part stores said setting information in a section overhead of said transmission frame.

8. An SDH transmission node according to claim 7, wherein said setting information transfer part stores said setting information in an undefined portion of said section overhead.

9. An SDH transmission node according to claim 7, wherein said setting information transfer part stores said setting information using an unused portion of a predefined byte of said section overhead.

10. An SDH transmission node according to claim 6, wherein said setting information transfer part stores said setting information in a path overhead of said transmission frame.

11. An SDH transmission node according to claim 10, wherein said setting information transfer part stores said setting information using an unused portion of a predefined byte of said path overhead.

12. An SDH transmission node connected with first other SDH transmission node while facing said first other SDH transmission node through a work line for transmitting a transmission frame conforming to an SDH transmission method and a protection line which functions as a backup for said work line, comprising a setting information detection part which detects line switching mode setting information on a line switching control between said work line and said protection line at said first other SDH transmission node which information is corresponds to one of plurality of route settings between said first other SDH transmission node and transferred from said first other SDH transmission node, a slave mode setting part which sets a line switching mode at its own side in accordance with said line switching mode setting information corresponds to the one of route settings detected by said setting information detection part, and a slave line switching control part which performs a line switching control at its own side in accordance with said line switching mode set by said slave mode setting part.

13. An SDH transmission node according to claim 12, wherein said setting information detection part detects said setting information which is transferred from said first other SDH transmission node having been stored in said transmission frame.

14. An SDH transmission node according to claim 13, wherein said setting information detection part detects said setting information stored in a section overhead of said transmission frame.

15. An SDH transmission node according to claim 14, wherein said setting information detection part detects said setting information stored in an undefined portion of said section overhead.

16. An SDH transmission node according to claim 14, wherein said setting information detection part detects setting information stored by using an unused portion of a predefined byte of said section overhead.

17. An SDH transmission node according to claim 13, wherein said setting information detection part detects said setting information stored in a path overhead of said transmission frame.

18. An SDH transmission node according to claim 17, wherein said setting information detection part detects said setting information stored by using an unused portion of a predefined byte of said path overhead.

19. An SDH transmission node according to claim 12, wherein said SDH transmission node is provided with a setting information re-transfer part which transfers said setting information detected by said setting information detection part to a second other SDH transmission node other than said first other SDH transmission node as setting information on a line switching control at said second other SDH transmission node.

20. An SDH transmission node according to claim 19, wherein said setting information re-transfer part transfers said setting information to said second SDH transmission node by storing said setting information into said transmission frame.

21. An SDH transmission node according to claim 20, wherein said setting information re-transfer part stores said setting information in a section overhead of said transmission frame.

22. An SDH transmission node according to claim 21, wherein said setting information re-transfer part stores said setting information in an undefined portion of said section overhead.

23. An SDH transmission node according to claim 21, wherein said setting information re-transfer part stores said setting information by using an unused portion of a predefined byte of said section overhead.

24. An SDH transmission node according to claim 20, wherein said setting information re-transfer part stores said setting information in a path overhead of said transmission frame.

25. An SDH transmission node according to claim 24, wherein said setting information re-transfer part stores said setting information by using an unused portion of a predefined byte of said path overhead.

26. A line switching control method in an SDH transmission system which is provided with at least two SDH transmission nodes handling a transmission frame conforming to an SDH transmission method while making SDH transmission nodes connected with each other while facing each other through a work line which transmits said transmission frame and a protection line which functions as a backup for said work line, characterized in that one SDH transmission node sets one of a plurality of line switching modes setting information, which corresponds to one of route setting between the another SDH node and indicating a mode of said line switching control at its own side, said line switching mode setting information on a line switching control between said work line and said protection line at said one SDH transmission node is transferred from said one SDH transmission node to another SDH transmission node, and said another SDH transmission node performs a line switching mode setting at its own side in accordance with the transferred line switching mode setting information corresponds to the one of route settings from said one SDH transmission node, and a line switching control at its own side in accordance with said line switching mode set by said line switching mode setting.

27. A line switching control method in an SDH transmission system according to claim 26, wherein said other SDH transmission node further transfers said setting information transferred from said one SDH transmission node to another SDH transmission node other than said one SDH transmission node as setting information on a line switching control between said work line and said protection line at said another SDH transmission node.

28. A line switching control method in an SDH transmission system according to claim 26, wherein said setting information is transferred by being stored in said transmission frame.

29. A line switching control method in an SDH transmission system according to claim 27, wherein said setting information is transferred by being stored in said transmission frame.

* * * * *